United States Patent [19]
Baker

[11] Patent Number: 5,864,116
[45] Date of Patent: Jan. 26, 1999

[54] D.C. CHOPPER WITH INDUCTANCE CONTROL FOR WELDING

[75] Inventor: Ivan E. Baker, Concord, Ohio

[73] Assignee: The Lincoln Electric Company, Cleveland, Ohio

[21] Appl. No.: 900,724

[22] Filed: Jul. 25, 1997

[51] Int. Cl.$^6$ ........................................................ B23K 9/09
[52] U.S. Cl. .............................. 219/130.33; 219/130.51; 219/137 PS
[58] Field of Search .................... 219/130.51, 130.21, 219/130.31, 130.32, 130.33, 137 PS

[56] References Cited

U.S. PATENT DOCUMENTS 5,637,246    6/1997    Ikegami .

*Primary Examiner*—Clifford C. Shaw
*Attorney, Agent, or Firm*—Vickers, Daniels & Young

[57] ABSTRACT

A multi-stage down chopper for arc welding by creating current flow between an electrode and a workpiece, the chopper includes a D.C. input source, a first switching stage, with a first switch device and a first choke, this first stage selectively connects the D.C. input source across the electrode and workpiece at a controlled duty cycle and switching rate and a second switching stage, with a second switch device and a second choke, the second stage also selectively connects the D.C. input source across the electrode and workpiece at the aforesaid controlled duty cycle and switching rate, wherein the chopper is improved by the first and second chokes onto a single core and by providing a minimum current override feedback circuit.

24 Claims, 5 Drawing Sheets

5,864,116

D.C. CHOPPER WITH INDUCTANCE CONTROL FOR WELDING

The present invention relates to the art of a D.C. down chopper for use in a variety of welding operations, and more particularly to a improved D.C. down chopper having a circuit for controlling the effective inductance between the down chopper and the welding operation.

INCORPORATION BY REFERENCE

Most D.C. welders are single stage or double stage inverters for converting a D.C. power source into a controlled D.C. welding current by using a pulse width modulator to create a series of current pulses that have controlled duty cycles to define the parameters of the welding operation. For many years it has been known to use a D.C. chopper having a pulse width modulator controlled switching device for applying discrete current pulses from a D.C. power source across a welding station. Many patents disclose D.C. choppers used in welding. One of these many patents is Ikegami U.S. Pat. No. 5,637,246, which is incorporated by reference herein. This patent shows the architecture of a down chopper used for controlling an engine driven arc welder, wherein the switching drive is controlled by a comparator between the sensed actual arc current and a desired reference signal created by a circuit associated with the down chopper. The general architecture and control arrangement used in D.C. choppers used as an arc welder are illustrated. Although the chopper in this prior art patent is operated by an engine driven generator, the D.C. input source for the down chopper is often a rectifier controlled by a single phase or three phase power supply. The present invention is particularly adapted for engine driven units similar to Ikegami U.S. Pat. No. 5,637,246; however, it has equal application to a down chopper using a rectified A.C. input to define the D.C. input source of the down chopper.

BACKGROUND OF THE INVENTION

When constructing down choppers, it is often necessary to provide two or more power modules in parallel, with each of the modules providing a given amount of current, such as 200 amperes. In the past, each of the power modules is connected in parallel and requires its own choke to create the desired output inductance for controlling current flow through the arc and modulating the input pulses to the welding operation. When separate chokes were heretofore used in the output of each power module in a multi-stage D.C. chopper, certain difficulties were presented. Since the output chokes of the various stages were in parallel, the effective inductance of the down chopper was substantially reduced. Consequently, there was a rapid rise of short circuit current, which rate of rise could exceed 300 amperes/msec. This rapid rise of the current at the output of the down chopper produced a very harsh, drastically pinched arc and caused substantial spatter. Thus, the use of the two or more parallel power modules in a D.C. chopper, of the type to which the present invention is directed, were not adapted for smooth and controlled arc welding.

As another background concept, prior D.C. choppers used for welding had variable output chokes, or inductors, to control the rate of rise of short circuit current. By adding more inductance into the output circuit of the chopper, there was a slower rate of rise. This slower rate of rise results in a softer, more fluid arc, with less spatter. The faster rate of rise, which is caused by decreased effective inductive reactance when using multi-stage down choppers, results in a harsher more penetrating arc with more spatter. If the inductance is caused to decrease by a large magnitude, the arc current may be insufficient to maintain the arc, which can result in an unstable arc in the welding operation. Problems associated with an inductor arrangement having low inductance is especially troubling at extremely low wire feed speeds. To correct problems associated with high or low inductance values in a down chopper, the welding industry has generally adopted inverters so that a premonition circuit can sense an impending short and initiate a current ramping circuit to control the rate of rise of the current electronically without substantial dependence upon the value of the inductance in an output choke. Use of an inverter, with electronically controlled current pulses to control the welding operation, has resulted in some difficulty in that the system was not able to sense the exact time of a short, especially when long cables were used for the welding operation.

The disadvantages associated with parallel output chokes in a multi-stage down chopper and the vicissitudes of the output chokes when used to control the slopes of rising current and decreasing current at the output of the down choppers are still problems which plague the down chopper and cause hesitation in the adoption of a down chopper for welding. Down choppers often require two or more parallel power modules or switching stages to obtain the necessary output capability. This demand results in the problems associated with parallel operation of switching device inductors. In addition, down choppers have no procedure for electronically controlling the pulse shape of the wave form in a welding cycle, so the problems associated with attempting to adjust the output inductor or inductors to control either the rise or fall of the welding current have not been resolved. All of these problems have contributed to the preference of inverters over less expensive, more rugged and maintenance free down choppers.

THE PRESENT INVENTION

The present invention relates to improvements in a D.C. down chopper used for arc welding, which chopper overcomes some of the problems associated with the use of one or more inductors or chokes especially problems associated with a down chopper having a capacity increased by including two or more parallel power modules. In accordance with one aspect of the present invention, the parallel power modules used in a D.C. chopper to increase the output current capacity, when used for arc welding, are modified so the output inductors or chokes are magnetically coupled onto a single, high permeability iron core. Transformer coupling of the two or more output chokes or inductors causes the inductive reactance in the separate power modules to remain high, without diminution normally associated with mounting the chokes or inductors in parallel. As an example, if the chokes in each of the parallel power modules had an inductive reactance of 150 mh and were connected in parallel, the effective output inductance of the down chopper, when two parallel power modules were used, would be approximately 75 mh. By using the present invention, the effective inductance at the two output stages of the down chopper remains at 150 mh. This effectively doubles the system inductance and, with the duty cycle of the pulse width modulator held generally constant, results in a rate of rise of the short circuit current of about 150 amperes/msec. As previously described, the same system had a current rise of approximately 300 amperes/msec. when the chokes or inductors were connected in parallel, but were not magnetically coupled.

In accordance with this aspect of the present invention, there is provided an improvement in a multi-stage down chopper for arc welding that creates a current flow between an electrode and a workpiece. The chopper includes a D.C. input source, a first switching stage with a first switch device, a first flywheel diode, and a first choke, which first stage selectively connects the D.C. input source across the electrode and workpiece at a controlled rate, a second switching stage with a second switch device, a second flywheel diode, and a second choke, which second stage selectively connects the D.C. input source across the electrode and workpiece at a controlled switching rate and a pulse width modulator for controlling the switching rate in accordance with a control signal. The improvement of the invention is the concept of providing a magnetically permeable core and means for transformer coupling the first and second choke onto the core by winding the chokes onto the same core. In accordance with the invention, the D.C. source for the down chopper can be a generator driven engine, such as disclosed in Ikegami U.S. Pat. No. 5,637,246 or a rectified A.C. power source. In accordance with the invention, several switching stages can be employed. In practice, two parallel switching stages are used in the down chopper. The switching devices are preferably IGBTs, but can be other rapidly operated power switches, such as FETs.

Whether using a multi-stage down chopper, as defined above or single stage down chopper, the second aspect of the present invention provides a technique that controls the effective inductance of the arc. This is done by closed loop control of the minimum arc current. In accordance with this aspect of the invention, an error amplifier is used to integrate the arc voltage while the arc current is sensed or monitored. When the arc current attempts to shift below a preselected minimum current value, the voltage integrator controlling the error amplifier of the pulse width modulator is overridden by a circuit to control the error amplifier. The circuit maintains at least a minimum current at a preselected level. By adjusting the set minimum current, the effective inductance of the arc is controlled without actually changing the size of the choke or chokes in the output of the down chopper. By increasing the set minimum arc current, the arc of the welding operation becomes softer with less spatter. As a corollary, a decrease in the set minimum arc current causes additional spatter and a more penetrating arc. By using the present invention, the override circuit for maintaining at least a minimum set current at the output of the down chopper insures that the arc of the welding operation never approaches a low current, such as zero, which would make the arc unstable. By using this aspect of the invention, the arc remains stable even at very low wire feed speeds. In practice, a welding operation has been accomplished using this aspect of the invention with a L50 welding wire from The Lincoln Electric Company having a diameter of 0.035 inches. This welding operation was reduced in speed to 60 inches per minute and surprisingly the arc remained stable. This stabilizing aspect of the present invention is independent of the length of the electrode cables, which feature has heretofore caused difficulties especially at low welding speeds.

The aspect of the present invention, as defined above, provides a preselected set minimum current for the welding operation. It is generally applicable when the welding operation is monitored by a closed circuit feedback loop regulating the arc voltage to a preselected set voltage. However, the minimum current override circuit can also be employed when the closed loop feedback circuit is regulating the output of the down chopper to maintain a preselected welding current or a preselected relationship of voltage and current, as used in pipe welding. In accordance with another aspect of the invention, the minimum set current of the present invention can be a function of the average actual current across the arc. By using this aspect of the invention, the minimum current set in the override circuit automatically changes in accordance with, or as a function of, the average arc current. This feature of the invention automatically adjusts the arc softness as the wire feed speed or wire diameter is varied from one welding operation to another. As the average current level changes, the minimum current of the override circuit of the present invention is changed proportionally.

An advantage of using the minimum current override circuit of the present invention is found when using the down chopper of the present invention for pipe welding. In the past, the voltage current slope used in pipe welding had to be fairly steep, so the open circuit voltage at low currents is relatively high. By using the present invention, the theoretical open circuit voltage can be set quite low for pipe welding by using an operating curve with a very gradual slope. By using this gradual slope, as the current decreases in the pipe welding operation, the voltage increases gradually until the minimum current of the override circuit is reached. At that time, the down chopper controls the welding operation in a constant current mode, thus creating a substantial open circuit voltage. This use of the present invention alleviates the problem caused by the tendency for the arc to be extinguished when pipe welding along a fairly gradual current/voltage curve. In accordance with this use of the invention, as the current approaches a low level, the minimum current of the override circuit instantaneously raises the voltage to whatever level is needed, only limited to the maximum open circuit voltage of the power supply. The increased voltage maintains the set minimum current of the override circuit. The invention prevents the arc from being extinguished, even when pipe welding along a fairly gradual current voltage curve.

The primary object of the present invention is the provision of an improved D.C. down chopper used for welding, which down chopper can be constructed with parallel power stages, without the need for balancing currents and without the need for increasing the reactance of the individual output chokes or inductors.

Still a further object of the present invention is the provision of an improved D.C. down chopper, as defined above, which D.C. down chopper changes the effective inductance of the arc by incorporating a minimum current override circuit in the down chopper, whereby the current in the welding operation never decreases below a given set current level and, thus, adjusts the effective inductance of the chopper.

Yet another object of the present invention is the improvement of an improved D.C. down chopper, as defined above, which D.C. down chopper does not require substantial changes in the existing technology, but results in superior operation of the down chopper when using multiple power stages and when welding at a minimum current which could cause an arc blow out.

These and other objects and advantages will become apparent from the following description taken together with the accompanying drawings.

BRIEF DESCRIPTION OF THE DRAWINGS

FIG. 1A is a schematic block diagram of an alternative D.C. input source for use in the down chopper shown in FIG. 1;

PREFERRED EMBODIMENT

Figure 1:
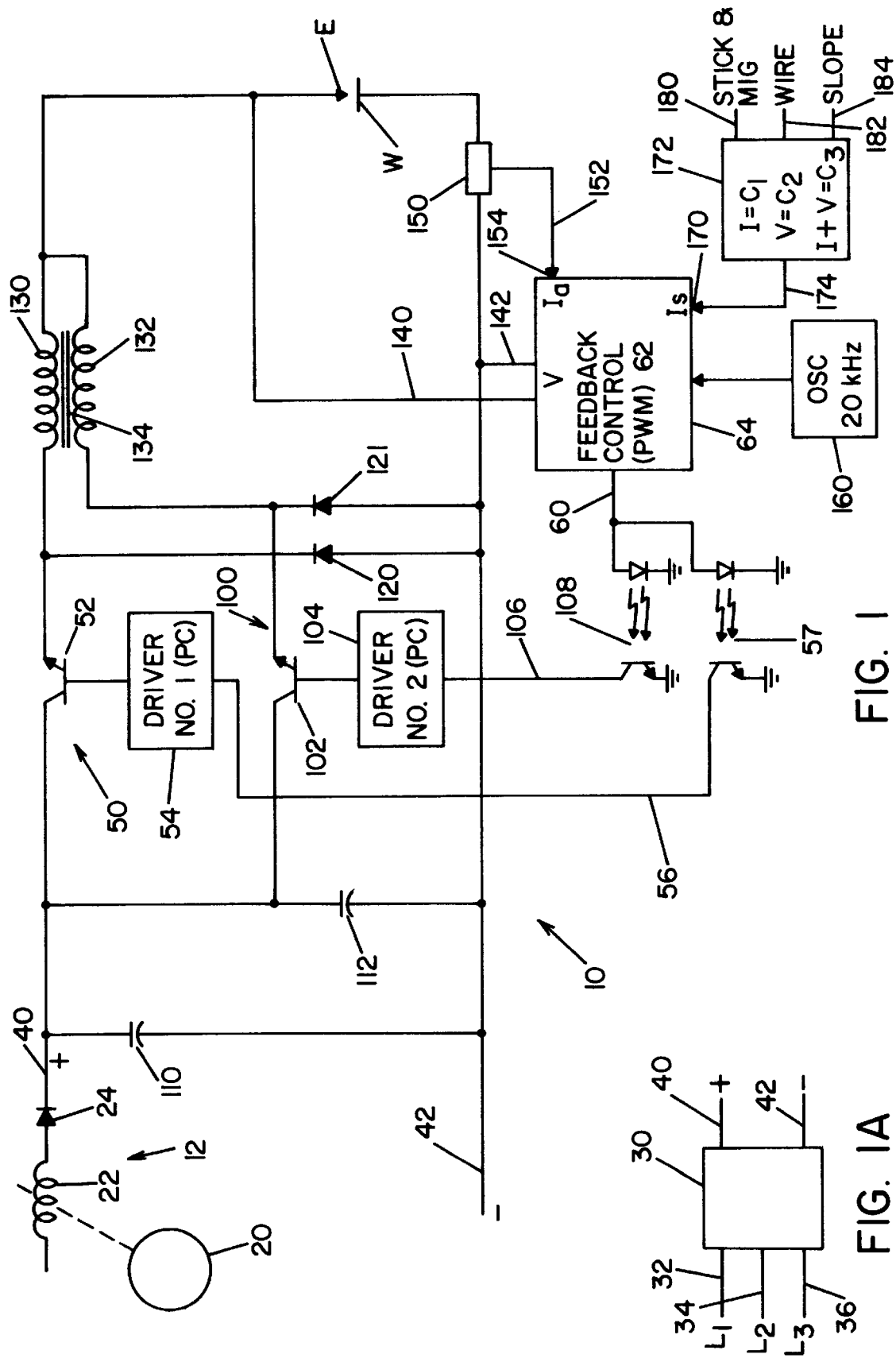
FIG. 1 is a wiring diagram, showing a D.C. down chopper used for an arc welding process, wherein a plurality of parallel power modules are employed in a manner to use one aspect of the present invention.

Referring now to the drawings wherein the showings are for the purpose of illustrating the preferred embodiment of the invention only and not for the purpose of limiting same, FIG. 1 shows a multi-stage D.C. down chopper 10 used as an arc welder for directing a current between electrode E and workpiece W. Chopper 10 includes a D.C. input source 12 illustrated in the form of a motor 20 driving a generator or alternator with a stator output winding 22, the output of which is isolated by a diode 24. An alternative type of D.C. input source is illustrated in FIG. 1A wherein rectifier 30 has a three phase input including lines 32, 34 and 36 and a D.C. output across leads 40, 42, which leads are also illustrated as the input to chopper 10, shown in FIG. 1. The chopper includes a first switching stage 50 including switching device 52 in the form of an IGBT or a FET, with an isolated optically coupled IGBT driver 54 switched according to the pulses on feedback input 56 driven by a standard optical coupler 57 at a frequency of between 20–40 kHZ. In practice, pulses on the input to driver 54 is from the output 60 of the pulse width modulator PWM 62 in a feedback control network 64. The pulses on line 60 causes switch device 52 to be opened and closed at a rate of 20 kHZ with the duty cycle on the pulse width modulated output 60 being controlled to determine the amount of current directed across electrode E and workpiece W. The multi-stage chopper 10 includes a plurality of parallel power modules, only two of which are illustrated. The second module is switching stage 100 connected in parallel to the first switching stage 50 and including switching device 102 in the form of an IGBT or a FET with an isolated optically coupled IGBT driver 104 controlled by pulses in feedback input 106 optically coupled by device 108 to output 60 of the pulse width modulator 62. Each of the two stages has a bypass capacitor 110, 112, respectively, for allowing current to flow from source 12 when switch devices 52, 102 are non-conductive. When conductive, current is provided through the parallel switches to the arc welding operation, defined by current flow between electrode E and workpiece W. Freewheel diodes 120, 121 are connected in parallel with the welding operation and behind the parallel chokes 130, 132 of the first and second switching stages, respectively. In accordance with the present invention, chokes or inductors 130, 132 are coupled tightly in a transformer sense on common core 134. By using this concept, the effective inductance of chopper 10 is essentially the inductance of each of the inductors 130, 132 which are generally the same inductance. However, they do not need to be perfectly matched. In addition, switching devices 52, 102 need not be matched and current balance because the inductors are coupled onto the same core. The output inductance of each stage is not reduced, as it would be in a parallel circuit where chokes 130, 132 are separate from each other. Details of the first aspect of the invention are shown in FIG. 2, which details will be described.

Figure 8:
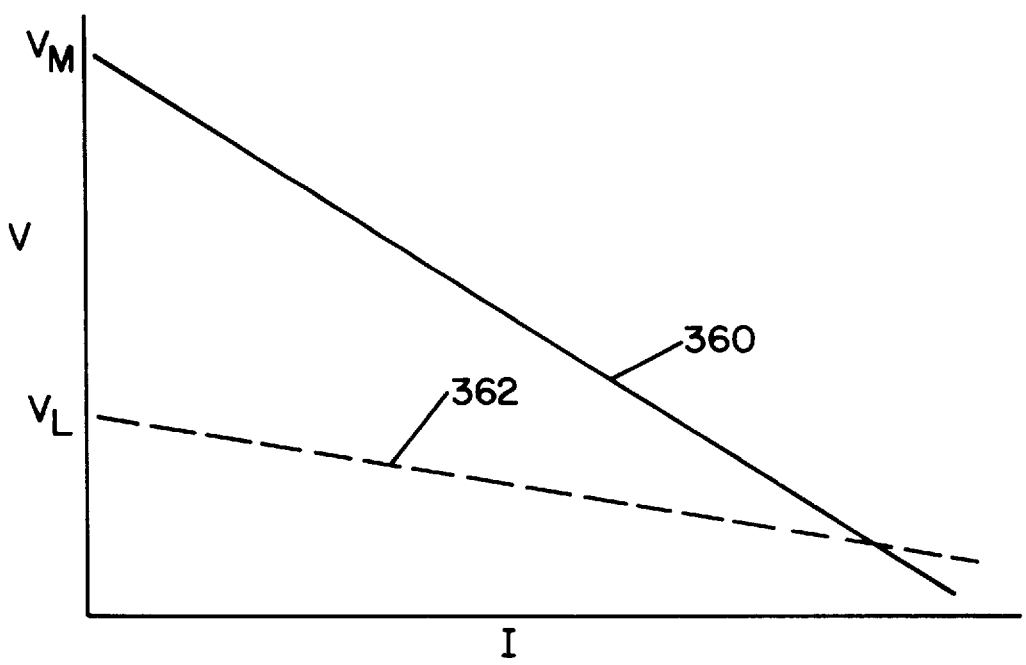
FIG. 8 is a current/voltage graph showing two operating curves for pipe welding operation to illustrate the disadvantage of using a relatively gradual slope; and, FIG. 9 is a graph similar to FIG. 8 illustrating the use of the present invention in a pipe welding operation and illustrating an advantage of the minimum current override circuit of the present invention.
Figure 9:
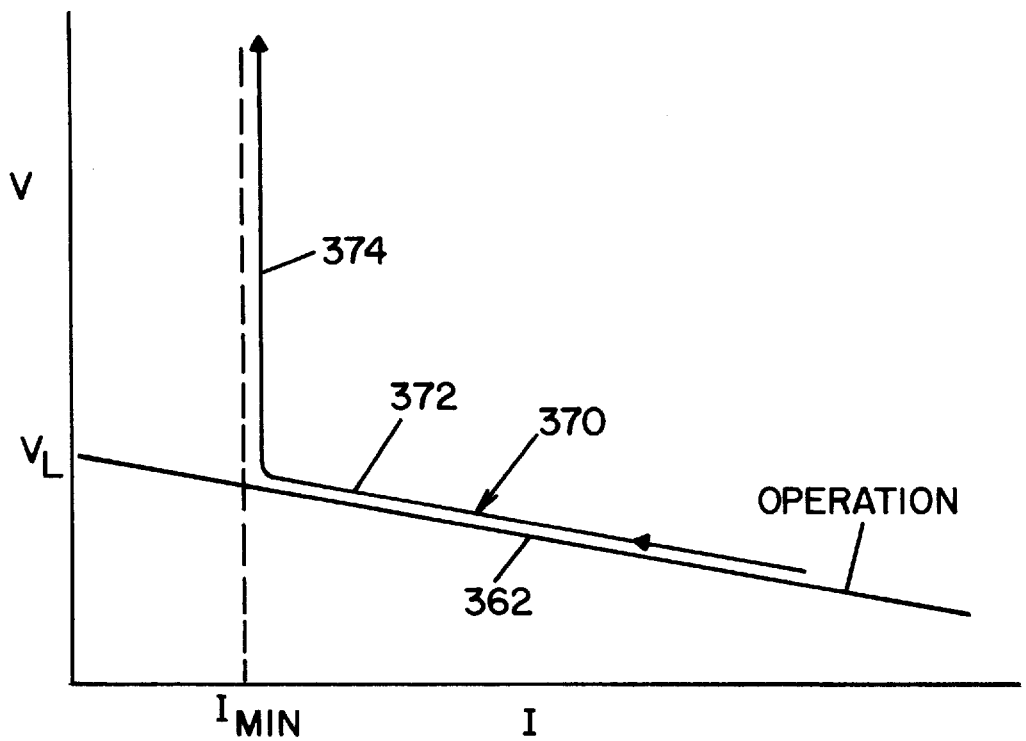

The voltage across the welding arc is sensed by lines 140, 142 and directed to feedback control network 64, as shown in FIG. 1. Current shunt 150 creates in line 152 a voltage level indicative of the current across the welding arc. Line 152 is connected to terminal 154 of network 64. In accordance with standard technology, oscillator 160 drives pulse width modulator PWM 62 at a frequency illustrated to be 20 kHZ; however, this frequency can be various levels, in the normal radio frequency range of 20–40 kHZ. The arc current at terminal 154 or the voltage across lines 140, 142 is compared with a set point reference voltage level applied to terminal 170, which reference voltage is controlled by line 174 at the output of selector network 172. Manual or automatic selection of a particular arc welding operation is determined by the logic on terminals 180, 182 or 184 or switches in network 172. In the illustrated embodiment, terminal 180 is selected when chopper 10 is to be used for stick welding or MIG welding. In this manner, the power supply or D.C. chopper is controlled so the current is at a fixed set level $C_1$. Terminal 182 is selected for wire welding when the voltage across line 140, 142 is to be maintained at a constant level or a preset slope indicated to be $C_2$. In slope welding, as used in pipe welding and shown in FIGS. 8 and 9, the slope of the current and voltage operating line is maintained constant at a level indicated to be $C_3$. This arc welding operation is selected at terminal 184. As will be explained later, when a voltage control is selected, a slight current trim can be used to produce a preset slope of voltage as a relationship to current, instead of a constant voltage.

In operation, switches in selector network 172 determine the type of arc welding to be conducted. The logic on line 174 is then compared, either to the voltage across lines 140, 142, the current level on line 152 or a combination of these two parameters. Feedback control network 64 includes pulse width modulator 62 which is controlled to determine the width or duty cycle of pulses on output line 60 at a frequency or switching rate controlled by oscillator 160.

Figure 2:
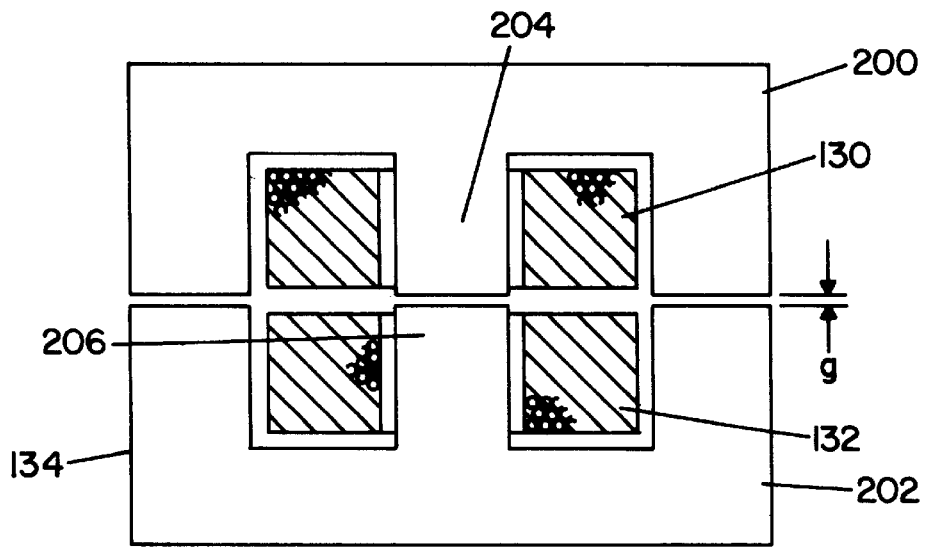
FIG. 2 is a cross section of the core for mounting the output chokes of a down chopper shown in FIG. 1 and, thus, implementing an aspect of the present invention.

Referring now in more detail to FIG. 2, core 134 is laminated from high permeability transformer iron pieces in the form of E-shaped halves 200, 202 with center post 204, 206 around which the individual windings of chokes 130, 132 are wrapped. In this manner, the two chokes are magnetically coupled and form an effective inductance for chopper 10 consistent with the selected value of the impedance in the individual chokes. In accordance with standard transformer technology, the halves 200, 202 are separated by a small gap g. In practice, the individual chokes have inductive reactance of 150 mh and the invention causes the resulting reactance of the chopper, with two or more stages to be 150 mh. This level was selected since stick welding requires enough stored energy in the chokes to prevent pop out.

By selecting a terminal 180,182 or 184 of network 172, chopper 10 operates in accordance with a desired mode. This function is illustrated in more detail in FIG. 3 where error amplifier 220 has a variable input on line 222 and a reference or set point input line 174 directed to positive terminal 224 so that the output in line 226 is a control signal having a voltage for controlling pulse width modulator 62. Amplifier 220 includes a gain control resistor 220a. This is standard technology for pulse width modulators used to control switching type power supplies. The error amplifier creates an output voltage on line 226, which is the control signal for selecting the duty cycle of the pulse width modulator operated in accordance with the frequency or rate oscillator 160. To prevent rapid changes in the duty cycle, amplifier 220 includes an integrator network 220b which causes an amplifier 220 to be an integrator when capacitor 220c is connected in parallel with resistor 220a.

The preferred embodiment shown in FIG. 1 has a feedback control network 64 with input lines 140, 142, 152 and 174. These same lines are illustrated in the upper portion of the wiring and block diagram shown in FIG. 3. Further details of the concepts of feedback network 64 are also shown in the diagram, where selector control 230 selects which of lines 232, 234 or 236 are to receive input signals to be directed to the variable input negative terminal or line 222 of error amplifier 220. The particular line for controlling the variable input to the error amplifier is selected by closing one of the switches 232a, 234a or 236a. Summing junction 240 has an output 242 directed to switch 234a. Summing junction 244 has an output 246 directed to switch 236a. This is the voltage control mode where summing junction 244 is controlled by voltage $V_a$ between lines 140, 142. If a slight slope is required for the voltage, resistor 250 directs a controlled ratio of current $I_a$ to summing junction 244. As illustrated, when switch 232a is closed, error amplifier 220 receives a variable signal representing arc current and integrator network 220b is not connected. Output 226 changes the pulse width modulator rapidly. Likewise, closing switch 236a directs the arc voltage to the variable input of the error amplifier. Switch 226b connects network 220b so the pulse width modulator changes gradually so the rate of current rise is controlled by chokes 130, 132. These two controls, voltage or current, are shown in selector control 230' of FIG. 3A. Selector switch network 172 having inputs 180, 184 and 186, respectively, includes switches 172a, 172b and 172c corresponding to the switches shown in control 230. In operation of the preferred embodiment shown in FIG. 3, and the alternative shown in FIG. 3A, when switches 232a and 172a are closed, error amplifier regulates the arc current to a fixed value $C_1$. By closing switches 236a, 236b and 172c, the error amplifier regulates the pulse width modulator 62 to control the voltage across the arc welding operation to $C_2$.

To create a slope for the voltage, resistor 250 is used. As an adjunct, to provide a slope type arc welding operation as used in pipe welding, switches 234a, 234b and 272b, which are not shown in the simplified version of FIG. 3A, are closed. In this manner, the slope of voltage/current is controlled by a constant $C_3$ by regulating the voltage on output 226, which is the control signal for pulse width modulator 62. The duty cycle of the pulses in line 60 is controlled by the voltage on line 226.

Figure 3:
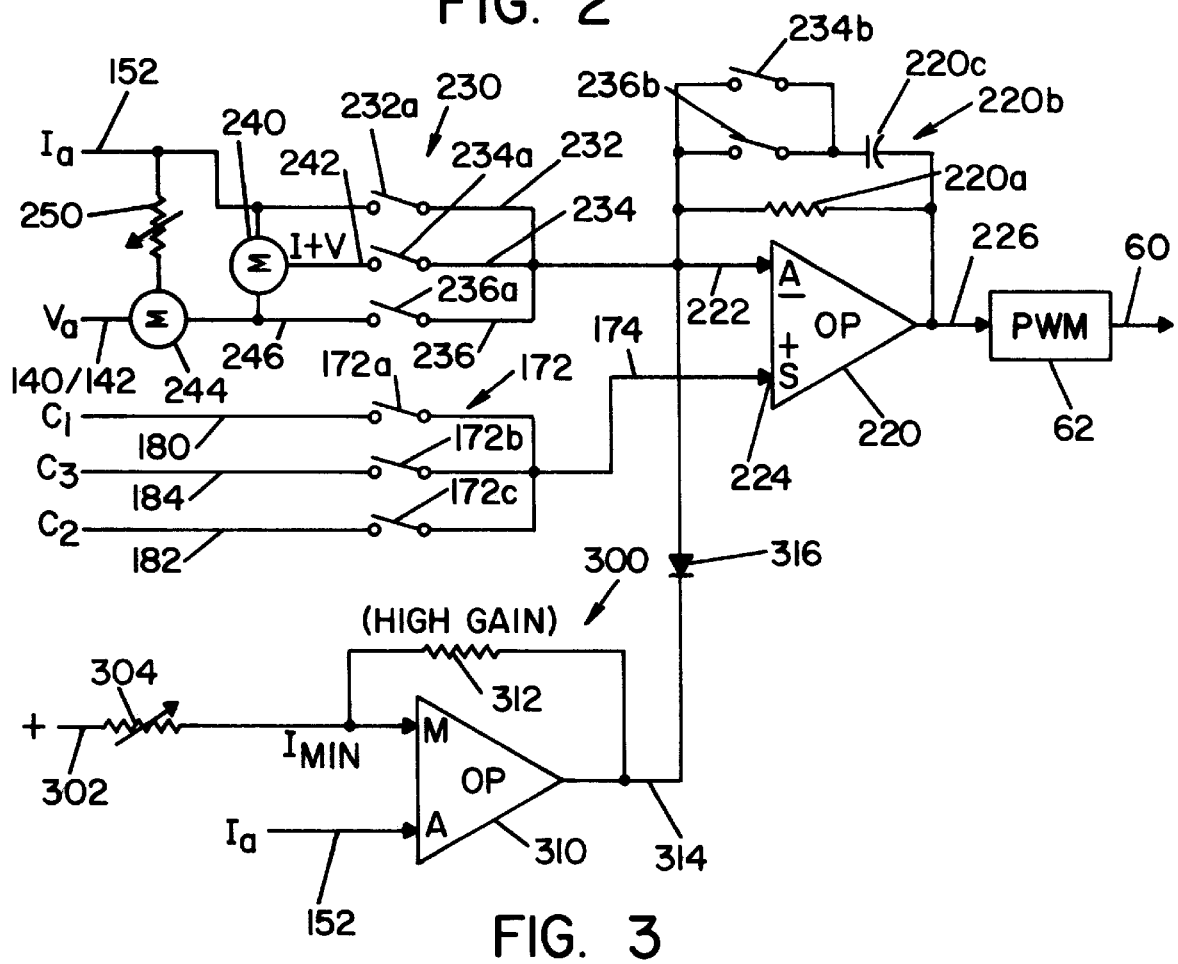
FIG. 3 is a schematic wiring and block diagram of the closed loop feedback circuit used in the present invention, together with an override set minimum current circuit provided in accordance with another aspect of the present invention.
Figure 3A:
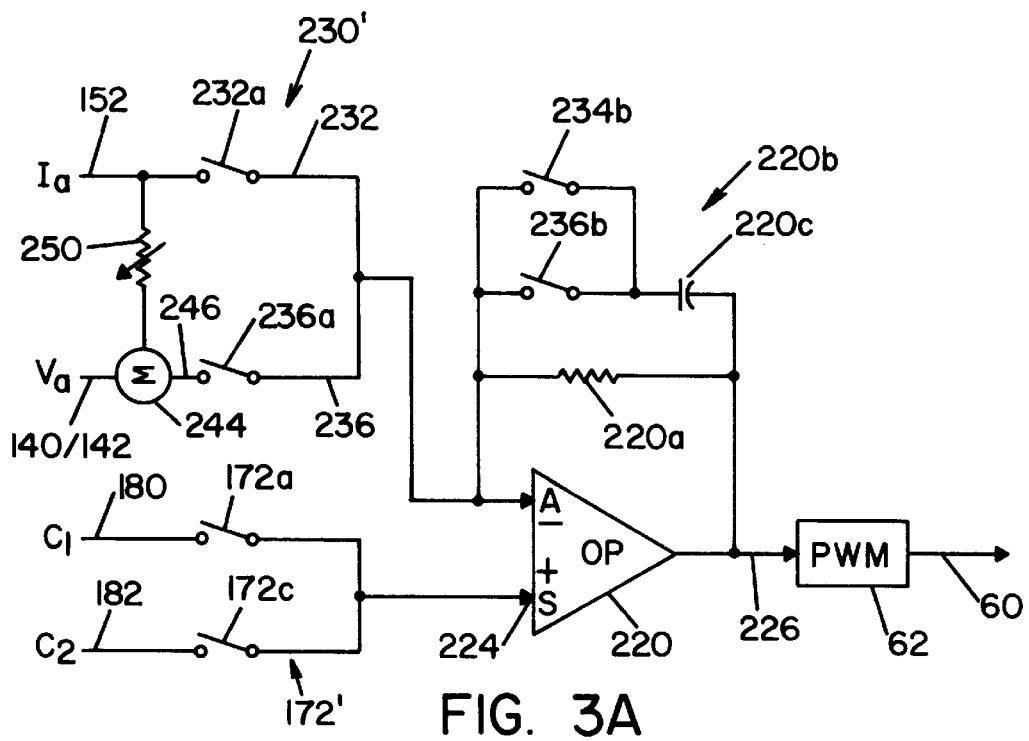
FIG. 3A is a simplified wiring and block diagram of a closed loop feedback system for creating the control signal used by the pulse width modulator when regulating only current or voltage, which system can be used with the down chopper of FIG. 1 without the inventive override circuit shown in FIG. 3.

In accordance with an aspect of the invention, as shown in FIG. 3, a current override circuit 300 is provided. This circuit employs first input 302 having a rheostat 304 for adjusting the set minimum current reference point to be used with the input 152 at a comparator 310. This comparator is provided with a high gain shunt resistor 312, whereby the output 314 holds diode 316 at a set minimum current when the arc current in line 152 is equal to or below the adjusted set minimum current determined by the setting of rheostat 304. Override circuit 300 allows the down chopper to be controlled by integrating the arc voltage at error amplifier 220 until the arc current decreases to a low value signaling an impending extinguishing of the arc. At that moment, comparator 310 connects diode 316 to the voltage on output 314 and controls the arc welding operation to track the minimum current level $I_{MIN}$ set by rheostat 304. The rheostat controls the effective inductance of the tail out portion of the welding cycle. As the current is adjusted up, the arc is softer. The arc current never reaches zero; therefore, it is very useful at low wire feed speeds. By using the present invention, as shown in FIG. 3, the arc voltage can be integrated and control the welding operation until a low current condition exist. An override control feature occurs at a preselected minimum level $I_{MIN}$. By adjusting the minimum current lower, there is more pinch as opposed to a softer arc and less spatter when the minimum current is adjusted to a higher level. The use of the minimum current override circuit, with the somewhat standard closed loop feedback control allows an adjustment of the effective output inductive impedance of the down chopper 10 shown in FIG. 1.

Figure 4:
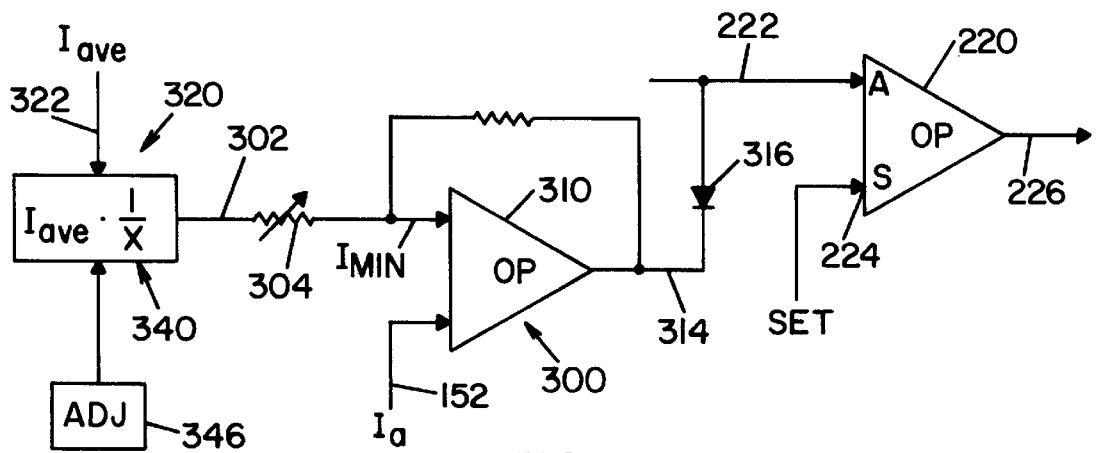
FIG. 4 is a simplified wiring and block diagram showing a further embodiment of the current override circuit illustrated in FIG. 3, with an automatic adjustment of the set minimum current, as a function of the average arc current of the welding operation driven by the D.C. chopper shown in FIG. 1.
Figure 5:
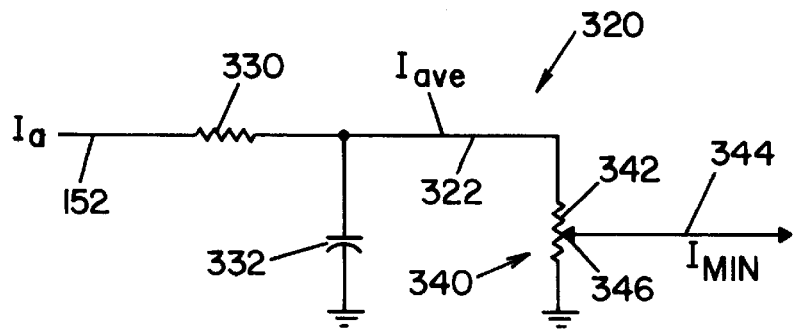
FIG. 5 is a wiring diagram showing the preferred embodiment for obtaining the set minimum current in the embodiment of the invention shown in FIG. 4.

In FIGS. 4 and 5, there is illustrated an automatic adjustment of the set minimum current $I_{MIN}$ for comparator 310 so the set current will automatically change with various arc parameters, such as wire speed. In accordance with this further aspect of the present invention, as the arc current shifts, the minimum current changes proportionally. In practice, the objective is obtained by controlling the minimum current setting from rheostat 304 in accordance with the average arc current on line 322. The average arc current is obtained from the voltage on line 152 through a filter network, including resistor 330 and capacitor 332. The average arc current is then multiplied by a reciprocal number indicated as electrical component 340 which includes rheostat 342 with arm 346 controlling line 334 connected directly to override circuit 300 or to rheostat 304 shown in FIG. 3. In this manner, adjustment of the rheostat arm 346 adjusts the reciprocal number to change the impact variations in the average arc current has upon the selected reference or set minimum current level $I_{MIN}$ at the input of comparator 310. By using the circuits illustrated in FIGS. 4 and 5, automatic adjustment of the set minimum current level for the override circuit 300 is accomplished. Further improvement is accomplished for the aspect of the invention where the override circuit is activated as the arc current reaches a low level.

Figure 6:
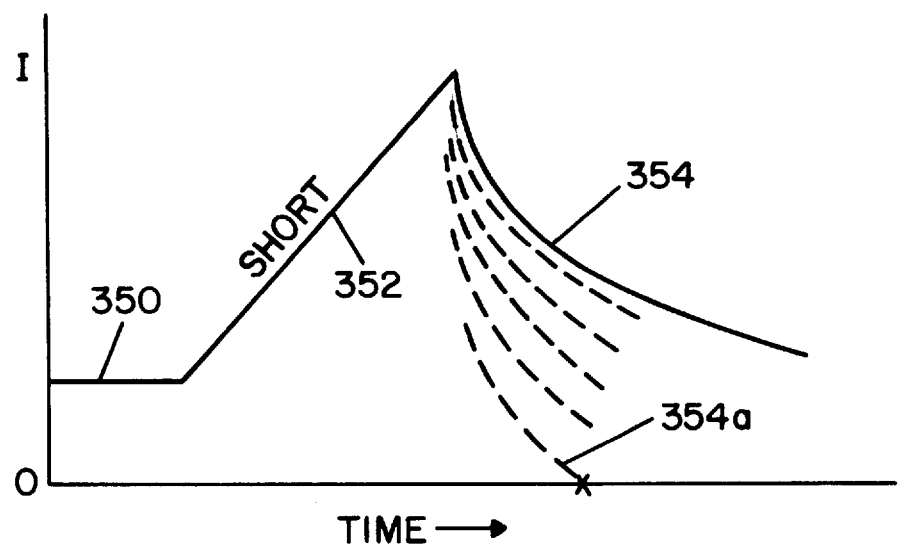
FIG. 6 is a graph of current pulse representing current magnitude as a function of time, when using a D.C. chopper without the minimum current override circuit forming a part of the present invention.
Figure 7:
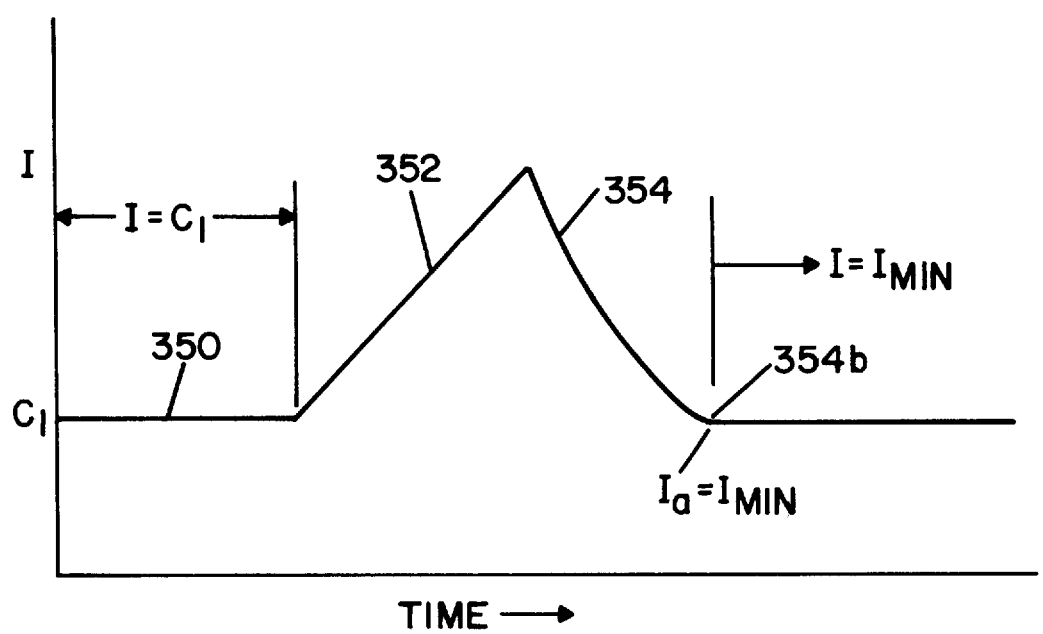
FIG. 7 is a graph similar to FIG. 6 illustrating a wave formed with a shape controlled by a D.C. down chopper with an override set minimum current circuit.

An advantage of the override circuit 300 is illustrated in FIGS. 6 and 7. In FIG. 6, down chopper 10 does not have an override circuit 300 and is operated by the network illustrated in FIG. 3A. By incorporating override circuit 300, down chopper 10 operates in accordance with FIG. 7. Both examples include a constant current portion 350, followed by a short having a rapid rise of current indicated by portion or line 352. The rate of rise of line 352 is controlled by inductor 130, 132 since the duty cycle of the pulse width modulator does not change because switch 236b activates integrator network 220b. After the short has ruptured, tail out 354 gradually shifts the current down during a constant voltage control stage. Without override circuit 300, tail out 354 can take the shape of curve 354a shown in FIG. 6. In this curve, the tail out current reaches zero current and an unstable arc condition results. By using override circuit 300, at point 354b in FIG. 7 the down chopper is converted to a fixed, set minimum current $I_{MIN}$ operation or a variable, set minimum current, using the circuits shown in FIGS. 4 and 5. Consequently, circuit 300 prevents an unstable arc condition. By using an adjustable set minimum current, the arc is controlled proactively. In both instances, the effective output inductance of chopper 10 is varied in a manner not obtained in a system having no override circuit.

Another advantage of circuit 300 is realized when down chopper 10 is used for pipe welding wherein the current and voltage changes along an operating line. The slope of the line is determined by closing switches 172b, 234a and 234b. As is known, the operating voltage/current line for a pipe welding operation should be relatively steep, as shown by line 360 of FIG. 8. By having a steep operating line, as the current decreases the voltage increases so that there is a substantial open circuit voltage when there is no current. It is advantageous to operate with a relatively gradual slope to the operating line, such as represented by line 362 in FIG. 8 and by line 362 in FIG. 9. When operating along this gradual line or curve, at zero current there is an insufficient open circuit voltage available from the power supply. This is not an efficient welding operation. By using override circuit 300, the welding operation is accomplished along line 370 shown in FIG. 9. Portion 372 of line 370 tracks along operating line 362 with the advantages of a gradual change in voltage with changes in the arc current. As the arc current decreases to the set minimum level $I_{MIN}$ used in circuit 300, override circuit 300 causes the down chopper to be regulated to the set minimum current. This is indicated by portion 374 of line 370 wherein a maximum open circuit voltage for the power supply is realized while maintaining the set minimum current whereby the arc is stabilized at low currents.

Various changes can be made in the circuits illustrated in the drawings without departing from the intended spirit and scope of the present invention.

Having thus defined the invention, the following is claimed:

1. In a multi-stage down chopper for arc welding by creating current flow between an electrode and a workpiece, said chopper including a D.C. input source, a first switching stage, with a first switch device and a first choke, said first stage selectively connects said D.C. input source across said electrode and workpiece at a controlled duty cycle and switching rate, a second switching stage, with a second switch device and a second choke, said second stage selectively connects said D.C. input source across said electrode and workpiece at said controlled duty cycle and switching rate, and a pulse width modulator for controlling said duty cycle and switching rate in accordance with a control signal, the improvement comprising: a magnetically permeable core and means for transformer coupling said first and second choke by winding said first and second chokes onto said core.

2. The improvement as defined in claim 1 wherein said D.C. source is a generator drive by an engine.

3. The improvement as defined in claim 2 wherein said chopper has only said first and said second switching stages.

4. The improvement as defined in claim 2 wherein said switching devices are IGBTs.

5. The improvement as defined in claim 1 wherein said switching devices are power FETs.

6. The improvement as defined in claim I wherein said switching devices are IGBTs.

7. The improvement as defined in claim 1 wherein said D.C. source is a rectifier having an A.C. input and a D.C. output.

8. The improvement as defined in claim 1 wherein said control signal is an error signal representative of the difference between the voltage across said electrode and workpiece and a reference signal indicative of a selected desired arc voltage.

9. The improvement as defined in claim 8 including an override circuit for limiting said control signal to a value maintaining at least a minimum current across electrode and workpiece.

10. The improvement as defined in claim 9 wherein said override circuit includes means for adjusting said minimum current.

11. The improvement as defined in claim 1 wherein said control signal is an error signal representative of the difference between the current across said electrode and said workpiece and a reference signal indicative of a selected desired arc current.

12. The improvement as defined in claim 11 including an override circuit for limiting said control signal to a value maintaining at least a minimum current across electrode and workpiece.

13. The improvement as defined in claim 12 wherein said override circuit includes means for adjusting said minimum current.

14. The improvement as defined in claim 1 wherein said control signal is a signal for controlling the relationship of voltage and current across said electrode and workpiece.

15. The improvement as defined in claim 14 including an override circuit for limiting said control signal to a value maintaining at least a minimum current across electrode and workpiece.

16. The improvement as defined in claim 15 wherein said override circuit includes means for adjusting said minimum current.

17. In a multi-stage down chopper for arc welding by creating current flow between an electrode and a workpiece, said chopper including a D.C. input source, a first switching stage, with a first switch device and a first choke, said first stage selectively connects said D.C. input source across said electrode and workpiece at a controlled duty cycle and switching rate, a second switching stage, with a second switch device and a second choke, said second stage selectively connects said D.C. input source across said electrode and workpiece at said controlled duty cycle and switching rate, and a pulse width modulator for controlling said duty cycle and switching rate in accordance with a control signal, the improvement comprising: a magnetically permeable core and means for transformer coupling said first and second choke by winding said first and second chokes onto said core, said control signal being an error signal representative of the difference between the voltage across said electrode and workpiece and a reference signal indicative of a selected desired arc voltage, and an override circuit for limiting said control signal to a value maintaining at least a minimum current across electrode and workpiece including means for controlling said minimum current as a function of the average current across said electrode and said workpiece.

18. The improvement as defined in claim 17 wherein said override circuit includes means for adjusting said function.

19. In a multi-stage down chopper for arc welding by creating current flow between an electrode and a workpiece, said chopper including a D.C. input source, a first switching stage, with a first switch device and a first choke, said first stage selectively connects said D.C. input source across said electrode and workpiece at a controlled duty cycle and switching rate, a second switching stage, with a second switch device and a second choke, said second stage selectively connects said D.C. input source across said electrode and workpiece at said controlled duty cycle and switching rate, and a pulse width modulator for controlling said duty cycle and switching rate in accordance with a control signal the improvement comprising: a magnetically permeable core and means for transformer coupling said first and second choke by winding said first and second chokes onto said core, said control signal being an error signal representative of the difference between the current across said electrode and said workpiece and a reference signal indicative of a selected desired arc current and an override circuit for limiting said control signal to a value maintaining at least a minimum current across electrode and workpiece including means for controlling said minimum current as a function of the average current across said electrode and said workpiece.

20. The improvement as defined in claim 19 wherein said override circuit includes means for adjusting said function.

21. In a down chopper for arc welding by creating a current flow between an electrode and a workpiece, said chopper including a D.C. input source, a switching stage with a switch device and a choke, said stage selectively connects said D.C. input source across said electrode and workpiece at a controlled duty cycle and switching rate, and a pulse width modulator for controlling said duty cycle and switching rate in accordance with a control signal, the improvement comprising: an override circuit for limiting said control signal to a value maintaining at least a minimum current across said electrode and workpiece.

22. The improvement as defined in claim 21 wherein said override circuit includes means for adjusting said minimum current.

23. In a down chopper for arc welding by creating a current flow between an electrode and a workpiece, said chopper including a D.C. input source, a switching stage with a switch device and a choke, said stage selectively connects said D.C. input source across said electrode and workpiece at a controlled duty cycle and switching rate, and a pulse width modulator for controlling said duty cycle and switching rate in accordance with a control signal, the improvement comprising: an override circuit for limiting said control signal to a value maintaining at least a minimum current across said electrode and workpiece including means for controlling said minimum current as a function of the average current across said electrode and said workpiece.

24. The improvement as defined in claim 23 wherein said override circuit includes means for adjusting said function.

* * * * *